United States Patent [19]
Reinbeck et al.

[11] 3,919,576
[45] Nov. 11, 1975

[54] ELECTRIC D-C VEHICLE MOTOR

[75] Inventors: Hans Reinbeck, Stuttgart; Karl-Hubert Stracke, Meerbusch; Alfred Collmer, Ludwigsburg, all of Germany

[73] Assignee: Robert Bosch G.m.b.H., Gerlingen-Schillerhohe, Germany

[22] Filed: Feb. 11, 1974

[21] Appl. No.: 440,986

[30] Foreign Application Priority Data
Mar. 2, 1973 Germany............................ 2310380

[52] U.S. Cl. ................. 310/207; 310/234; 310/259
[51] Int. Cl.² ........................................ H02K 23/26
[58] Field of Search ............ 310/46, 179, 195, 198, 310/184, 216, 89, 166, 91, 203, 168, 169, 170, 51, 264, 265, 207, 208, 227, 233, 234, 177; 318/326, 653

[56] References Cited
UNITED STATES PATENTS

| | | | |
|---|---|---|---|
| 783,498 | 1/1905 | Arnold | 310/233 |
| 1,224,518 | 5/1917 | Apple | 310/233 |
| 1,471,851 | 10/1923 | Kingsford | 310/233 |
| 1,602,523 | 10/1926 | Dake | 310/265 |
| 2,449,506 | 9/1948 | Pollard | 310/269 |
| 3,132,337 | 5/1964 | Martin | 310/170 |
| 3,309,548 | 3/1967 | Gough | 310/265 |
| 3,465,186 | 9/1969 | Susdorf | 310/195 |
| 3,500,092 | 3/1970 | Heilmann | 310/51 |
| 3,569,804 | 3/1971 | Studer | 310/168 |
| 3,699,371 | 10/1972 | Henry-Baudot | 310/207 |

Primary Examiner—R. Skudy
Attorney, Agent, or Firm—Flynn & Frishauf

[57] ABSTRACT

To permit light-weight construction with maximum efficiency, the d-c motor is a separately excited six-pole motor having a stepped, or split wave armature winding which is precisely symmetrically arranged on the armature, the armature itself forming a lamination package located on an armature carrier, for example of light-weight metal, for instance of aluminum, in wheel-type arrangement. The armature conductors are superimposed flat strips, the conductors of different windings being located adjacent each other in the armature slots, outer conductors of the armature being welded together, and, in turn, brazed or hard-soldered to the bottom conductor, and then to the commutator, to permit assembly without damage to surrounding insulation.

9 Claims, 5 Drawing Figures

ELECTRIC D-C VEHICLE MOTOR

The present invention relates to a dynamo electric machine and more particularly to d-c motors having fixed main poles and commutating or compensating poles on the stator, and in which the armature winding is a wave winding.

Vehicle motors, particularly for on-the-road, untracked vehicles of gross weight between 1 and 3 tons (metric) can be driven with electric motors; motors, as currently known for such vehicles do not, however, provide sufficient acceleration and speed for such vehicles, and are of excessive weight.

It is an object of the present invention to provide a d-c motor, particularly for use with road vehicles, such as electrically driven automobiles, which has light weight, is efficient in use, reliable, and can withstand the rough and highly variable operating conditions encountered in automotive use.

SUBJECT MATTER OF THE PRESENT INVENTION

Briefly, the d-c motor is a six-pole motor and has an exactly symmetrical armature winding which is formed as a stepped, or split wave winding in which two sides of spools are adjacent each other in a groove of the rotor.

Vehicle motors for vehicles which fall, approximately, within the 1–3 ton range previously were usually four-pole motors. The motor in accordance with the present invention is a six-pole motor which can be constructed to be much lighter. The particular armature winding in such a motor provides for excellent commutation with low armature reaction. Forming the armature winding as a strictly symmetrical winding is possible only when the motor is a six-pole motor. The stepped, or split wave winding in which the relationship of $u = 2$ (in which $u$ = number of conductors associated with any coil), in one groove, with respect to adjacent sides of a winding, provides for correct commutation, in time, of all the windings. The cross-sectional area of the lamination package in rotor and stator can be reduced with respect to four-pole motors, so that a reduction in weight can be obtained by about 33 percent with respect to a motor of similar power and having four poles.

The d-c motor, in accordance with the present invention, is preferably a separately excited motor. This permits electronic control of the motor, which contributes to reliability in operation and permits price reduction. The pole shoes of the stator are preferably salient poles, with a specific and novel type of shape in the air gap. This air gap is comparatively great. The contours of the main pole shoes are formed, in accordance with a feature of the invention, of two segmental circles, the centers of the circles being located spaced from the center line of the main poles. Thus, the voltages arising between the commutator segments are constant over the entire circumference of the commutator, thus suppressing danger of commutator flash-over.

The various windings, or coils of the armature preferably are formed as separate armature conductors. Additional losses due to current concentration in portions of the conductors are thereby avoided, thus improving commutation. If the armature conductors are solid, rather than sub-divided, the groove or slot leakage is decreased, resulting in commutation difficulties.

The rod-like armature conductors are preferably connected together by hard soldering or brazing; one of the conductors, preferably, is axially extended and brazed to the collector connection lug or flag. The interconnection of the armature conductors, by welding or brazing, preferably is carried out before the assembly of the conductors is secured to the collector. The armature conductors, at the end facing the collector, are superimposed. Connection of the axially extended conductor to the collector is thereby facilitated, and improved. The conductors can be stressed to a high temperature which may arise in operation, for example, upon failure of blowers or ventilators.

To cool the dynamo electric machine, separate radial blowers may be arranged, or an axial blower can be placed on the motor shaft. It is a matter of structural convenience, layout and price whether to use a separate radial blower cooling arrangement, or whether to use an axial fan or blower. Radial cooling blowers are cheaper; axial cooling arrangements are smaller. An axial blower or fan is arranged, preferably, at the end of the shaft of the motor which also carries the collector.

The invention will be described by way of example with reference to the accompanying drawings, wherein.

Figure 1:
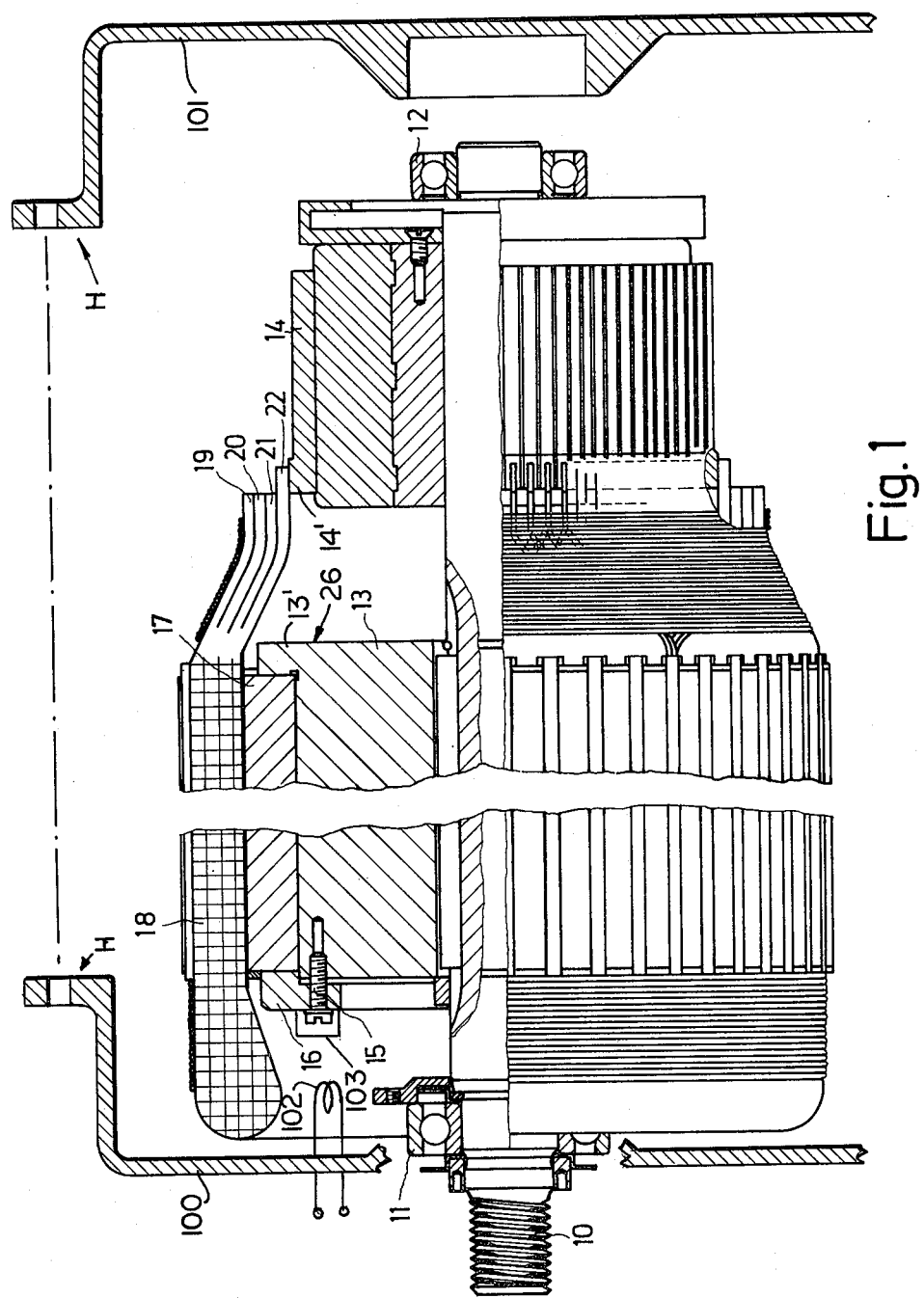
FIG. 1 is a part section, part side view of the rotor, including the armature for the motor of the present invention.

Shaft 10 (FIG. 1) is held in a suitable housing by the two bearings 11, 12. The housing is only schematically indicated at H, exploded from the motor. Shaft 10 carries a rotor lamination support or carrier 13 and a collector or commutator 14. Screws 15 secure a ring-shaped holder 16 to the carrier 13, the ring-shaped holder clamping the rotor lamination package between a projecting shoulder 13' of the carrier 13 and the ring 16. The carrier 13 forming an element of the structural support of the motor, as well as ring 16 are made of light-weight metal, such as aluminum, magnesium, or the like.

Armature winding 18 is a step or split wave winding and carried out completely symmetrically such that each rotor groove has two winding sides located therein, placed adjacent each other. The armature winding 18 is formed of sub-divided rod-like armature conductor bars or strips 19–22. The ends of conductor bars or strips 19, 20 and 21, at the commutator, or collector side, are welded together. The armature conductor 21 is brazed, or hard-soldered, to armature conductor 22. Armature conductor 22 is axially elongated and secured to a collector step or connection flag 14' by hard-soldering or brazing. Four flat conductors are provided for each collector element. The welding connections are made by the tungsten-inert gas welding process. Brazing, or hard-soldering can be carried out by resistance soldering or brazing processes. This differential connection method provides for economical and reliable attachment of the various conductors of the armature on the collector elements, which may be quite narrow.

The ends of the armature windings, that is, the rod-like terminal ends made, and arranged as shown in FIG. 1, due to their shape and placement on the armature act as a ventilating fan, that is, they have an effect similar to that of fan blades, and further act as heat exchange elements. Plasma welding or pressure-less welding may be used rather than the tungsten-inert gas welding process. The particular method and type of connection of the armature conductors to the collectors permits sequential operations being carried out on the conductors without influencing or damaging previously made connections. The outer armature conductors 19, 20 and 21 are located above each other at the side of the collector. They are of equal length; the conductor 22, however, is longer, and fits on the step, or connection flag 14' of the collector. Conductor 22 thus extends axially with respect to the other armature conductors 19 to 21. It is, therefore, an easy manufacturing step to apply an electrode to the projecting end of electrode 22. Hard-soldering or brazing of conductor 22 to the collector step 14' does not damage, or essentially affect insulation between the collector lamellae or collector elements themselves.

Figure 2:
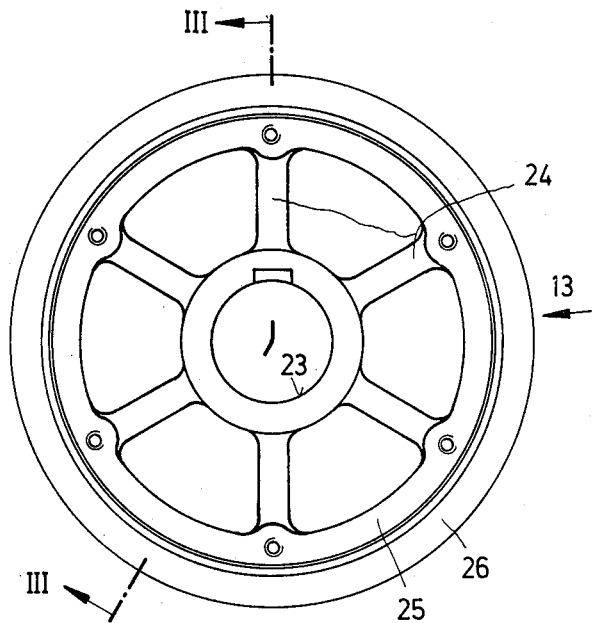
FIG. 2 is a view of the stator carrier taken as an end view along the arrow II of FIG. 3.
Figure 3:
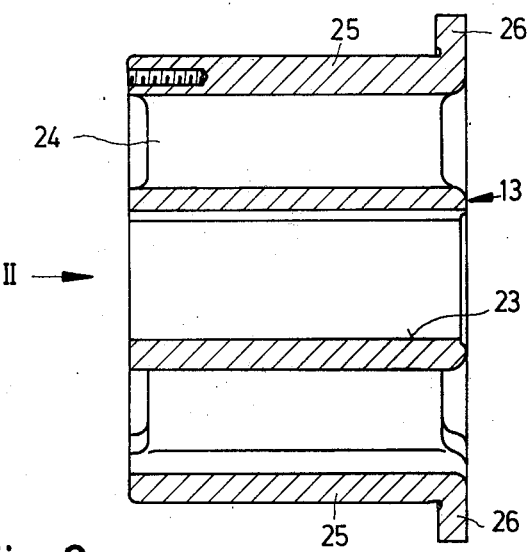
FIG. 3 is a sectional view along section III—III of FIG. 2, which is an angled section.

The armature magnetic structure, and its connection to the rotor carrier 13 is best seen in FIGS. 2 and 3. The carrier 13 is made preferably of aluminum; it has a central bore 23, in which the shaft 10 is fitted. The central portion of the carrier 13 is not formed as a solid body but, rather, has the cross section of a wheel with radial spokes 24, to which an outer ring 25 is connected, having a flange-like extension 26. This flange-like extension 26 forms the counter-part 13' (FIG. 1), holding the magnetic structure 17 of the armature in position on one side, the other side being secured thereto by means of ring 16.

Figure 4:
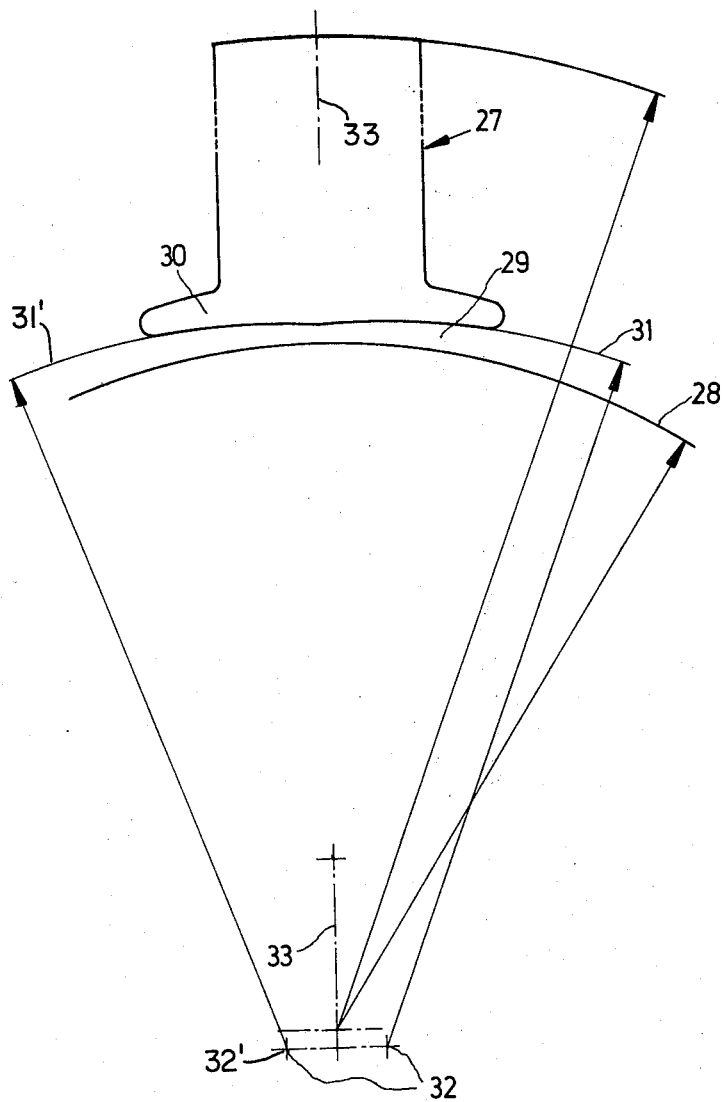
FIG. 4 is a schematic cross-sectional view showing the outline of a main stator pole, in relation to rotor axis of rotation.

The main pole 27 of the motor (FIG. 4) has a pole shoe which faces the outer circumference of the armature, indicated at 28 in FIG. 4. The air gap is quite large and seen at 29. The air gap is non-uniform over the arcuate extent of the pole shoe, and is generated by a pair of arcs 31, 31', the center points 32, 32' of which are laterally offset with respect to the axial center line 33 of the pole 27. This special shaping and arrangement of the main pole 27 results in constant voltage between the collector segments or elements, uniform over the entire circumference of the commutator, thus effectively suppressing danger of commutator flash-over.

The end bells 100, 101, and forming part of the structural elements of the motor (FIG. 1) are made of light-weight metal. A speed transducer, having a stationary pickup such as a coil 102 secured to a yoke (not shown) is attached to the end bell 100. A magnet 103 is secured to the rotor, for example by means of a clamp (not shown) connected to one of the screws 15, to be in magnetic circuit relationship to the yoke of coil 102 and provide a pulse upon each passage of the magnet 103 past the coil 102, to provide output pulses representative of rotation of the motor and hence of speed of operation thereof. Locating such a speed transducer within the housing, and interiorly of the end bell of the motor reduces the space requirements and improves the reliability of the motor since the components of the transducer can be well shielded from outside influences, dirt, or contamination.

Test motors, in accordance with the present invention, have been constructed to operate from a battery voltage of 144 V (d-c) in a speed range of from 2,000 to 6,700 rpm. Upon starting, the motors are capable of 200 percent of nominal power output; upon operation between 2,000 and 6,700 rpm, the motors are capable of continuous operation at 1.5 times the continuous rated power output. Continuous rated power outputs of the motors were 11, 16 and 26 kW.

Figure 5:
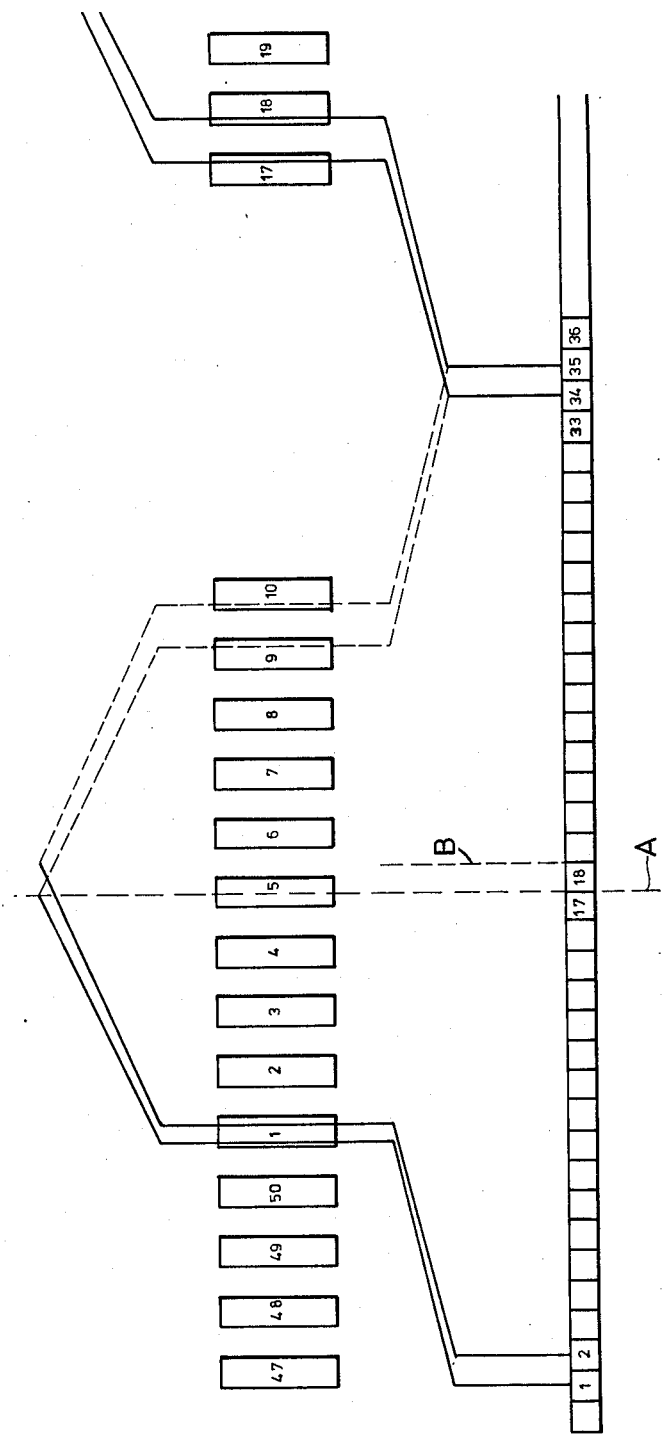
FIG. 5 is a winding diagram of the armature of the motor of the present invention.

The winding diagram for a 26 kW motor, as tested, is seen in FIG. 5. There are 100 windings (k = 100) in 50 circumferential grooves or slots (N = 50). The winding is a step, or wave winding. The commutator step was 33 (y = 33); the winding offset step was 17 (y1 = 17) and the progression step was 16 (y2 = 16; hence y = 33, see FIG. 5). The winding from the collector element 1 is symmetrically located in the armature package, that is, symmetrical with respect to its center line A, as well as with respect to the collector elements. The winding or coil from collector element 2 is symmetrical, with respect to its center line B, which will fall in the medium line between grooves, rather than in the middle of a groove, as seen in FIG. 5.

The motor of the present invention is particularly suitable for track-less automotive vehicles, to be operated by storage batteries, fuel cells, or the like in automotive applications.

The motors of the previous example have the following dimensions:

|  | 11 kW | 16 kW | 26 kW |
|---|---|---|---|
| rotor diameter (FIG. 4; 28) | 170 mm | 205 mm | 230 mm |
| minimum air gap: | 2,7 mm | 2,7 mm | 2,3 mm |
| maximum air gap: | 3,3 mm | 3,3 mm | 2,7 mm |
| field excitation, maximum, ampere/turns: | 5 700 | 7 000 | 8 400 |
| length, armature package 17: | 105 mm | 100 mm | 100 mm |
| conductors 19–22: | 4×58 | 4×58 | 4×58 |
| weight: | 60 kg | 83 kg | 98 kg |

We claim:

1. Light-weight electric d-c vehicle motor comprising a separately excited salient field pole stator and a rotor with slots in the magnetic circuit thereof a wave-type armature winding in the rotor slots, a commutator and light-weight structural support elements (100, 101) including end bells (100, 101), wherein the motor is a six-pole motor;

the winding is an exactly symmetrical armature stepped wave winding; one side of the armature winding coil is located in a slot adjacent the other side of another coil of the winding to provide for said exactly symmetrical armature winding;

the field pole has a non-uniform contour facing the air gap over its arcuate length, and is wider at the terminal ends of the field pole than at the center of the field pole, thus causing voltages between the commutator segments to be of a substantially uniform voltage potential over the circumference of the commutator;

the armature winding includes at least three stacked, superimposed individual flat conductor strips electrically and mechanically joined together and the bottom strip thereof is secured to a connection flag of the commutator element.

2. Motor according to claim 1, wherein the air gap between the stator field poles and the rotor circumference is in the order of 0,7–2 percent of rotor diameter.

3. Motor according to claim 1, wherein the field pole has a contour facing the air gap which is generated by two circles (31) symmetrical with respect to the center line (33) of the pole and passing through the motor axis, said circles having centers (32,32') spaced by a predetermined distance from and located at either side of said pole center line, to form said non-uniform air gap which, at the end portions of the pole will be wider than at the center of the pole.

4. Motor according to claim 1, wherein the superimposed individual conductor strips are welded together at the ends facing the commutator.

5. Motor according to claim 1, wherein the superimposed individual conductor strips are hard-soldered together at the ends facing the commutator.

6. Motor according to claim 1, wherein the bottom conductor strip (22) is longer than the other strips (19-21), said bottom conductor being secured to the commutator (14).

7. Motor according to claim 4, wherein the ends of the superimposed conductors (19, 22) secured to the commutator have a shape in the form of ventilating elements.

8. Motor according to claim 1, further comprising a speed transducer (102, 103) located within the end bell (100) of the motor housing at the side remote from the commutator.

9. Motor according to claim 1, wherein the structural support elements further comprise an armature carrier (13) of light-weight metal secured to the motor shaft (10) and carrying the armature (17; 19–22) at its outer circumference.

* * * * *